US012722562B2

(12) United States Patent
Mouri et al.

(10) Patent No.: US 12,722,562 B2
(45) Date of Patent: Sep. 1, 2026

(54) VEHICLE LIGHTING FIXTURE DEVICE

(71) Applicant: TOYOTA JIDOSHA KABUSHIKI KAISHA, Toyota (JP)

(72) Inventors: Fumihiko Mouri, Owariasahi (JP); Satoshi Ito, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 127 days.

(21) Appl. No.: 18/945,557

(22) Filed: Nov. 13, 2024

(65) Prior Publication Data

US 2025/0187530 A1 Jun. 12, 2025

(30) Foreign Application Priority Data

Dec. 6, 2023 (JP) ................................ 2023-206217

(51) Int. Cl.
*B60Q 1/14* (2006.01)

(52) U.S. Cl.
CPC ...... *B60Q 1/1415* (2013.01); *B60Q 2300/054* (2013.01); *B60Q 2300/112* (2013.01); *B60Q 2300/114* (2013.01)

(58) Field of Classification Search
CPC .. B60Q 1/22; B60Q 1/1415; B60Q 2300/054; B60Q 2300/112; B60Q 2300/114; B60Q 2300/50
See application file for complete search history.

(56) References Cited

U.S. PATENT DOCUMENTS

| | | | | |
|---|---|---|---|---|
| 2003/0146827 | A1* | 8/2003 | Koike | B60Q 1/543 340/436 |
| 2017/0203685 | A1 | 7/2017 | Hirai et al. | |
| 2017/0267167 | A1* | 9/2017 | Sakata | B60Q 1/247 |
| 2020/0070716 | A1* | 3/2020 | Sakata | B60Q 1/50 |
| 2021/0206312 | A1* | 7/2021 | Mochizuki | B60Q 1/50 |
| 2023/0107328 | A1* | 4/2023 | Mouri | B60Q 1/442 340/468 |

FOREIGN PATENT DOCUMENTS

| | | | |
|---|---|---|---|
| JP | 2021-127071 | A | 9/2021 |
| JP | 2023-055108 | A | 4/2023 |
| JP | 2023-086418 | A | 6/2023 |
| WO | 2016/027315 | A1 | 2/2016 |

* cited by examiner

*Primary Examiner* — Patrick C Chen
(74) *Attorney, Agent, or Firm* — SOLARIS Intellectual Property Group, PLLC

(57) ABSTRACT

A vehicle lighting fixture device configured to: at a time of forward travel of a vehicle, except during deceleration of the vehicle, control a lighting fixture of the vehicle so as to change, at a predetermined speed in a direction of travel of the vehicle, an illumination range on a road surface of light emitted from the lighting fixture, at a time of deceleration of the vehicle, control the lighting fixture so as to change, at a lower speed than the predetermined speed in the direction of travel of the vehicle, the illumination range on a road surface of the light emitted from the lighting fixture, and at a time of reversing of the vehicle, control the lighting fixture so as to change, in a direction of reversing of the vehicle, the illumination range on a road surface of the light emitted from the lighting fixture.

4 Claims, 13 Drawing Sheets

Figure 1:
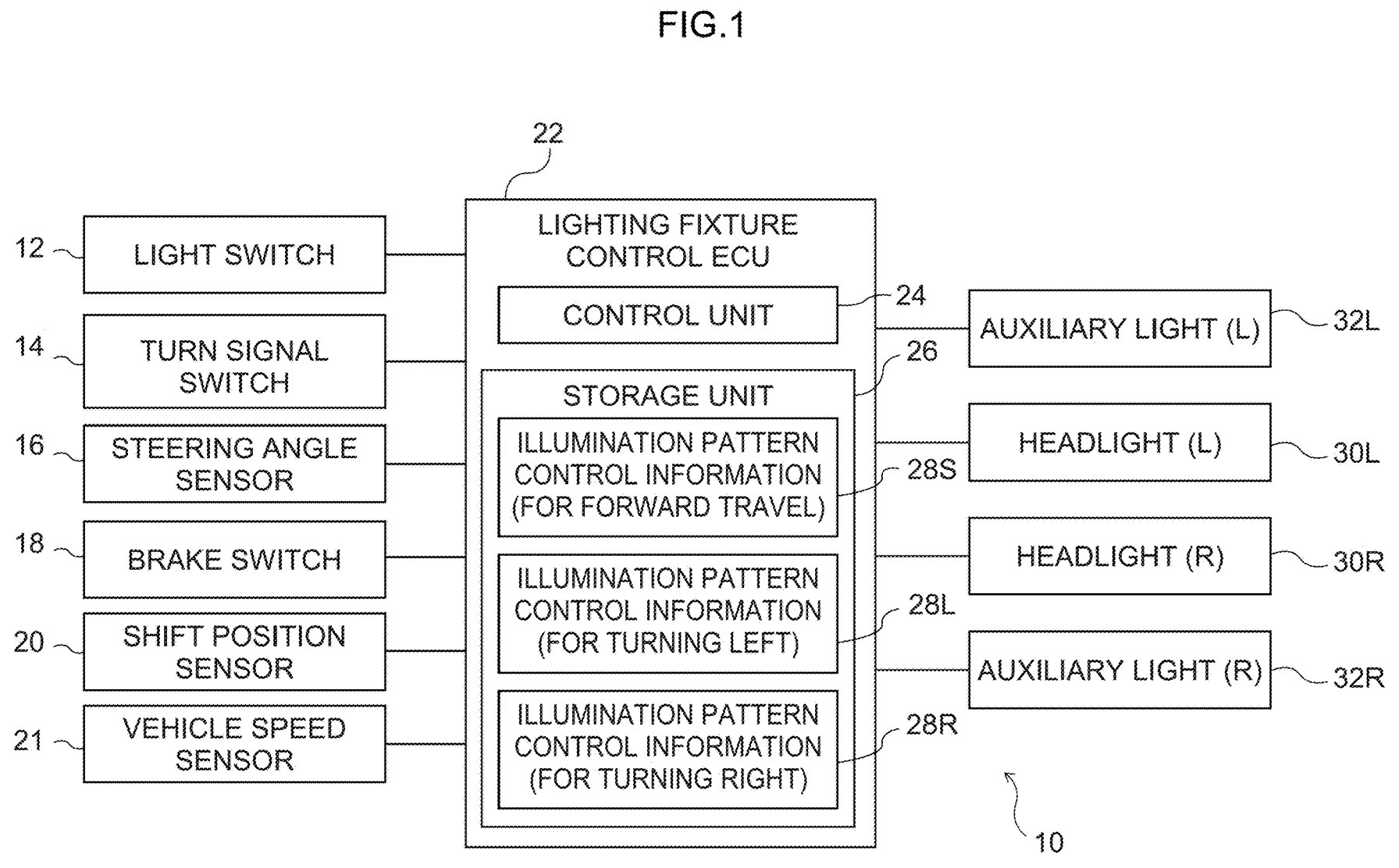

12 LIGHT SWITCH
14 TURN SIGNAL SWITCH
16 STEERING ANGLE SENSOR
18 BRAKE SWITCH
20 SHIFT POSITION SENSOR
21 VEHICLE SPEED SENSOR

22 LIGHTING FIXTURE CONTROL ECU
24 CONTROL UNIT
26 STORAGE UNIT
28S ILLUMINATION PATTERN CONTROL INFORMATION (FOR FORWARD TRAVEL)
28L ILLUMINATION PATTERN CONTROL INFORMATION (FOR TURNING LEFT)
28R ILLUMINATION PATTERN CONTROL INFORMATION (FOR TURNING RIGHT)

32L AUXILIARY LIGHT (L)
30L HEADLIGHT (L)
30R HEADLIGHT (R)
32R AUXILIARY LIGHT (R)

FIG.2B
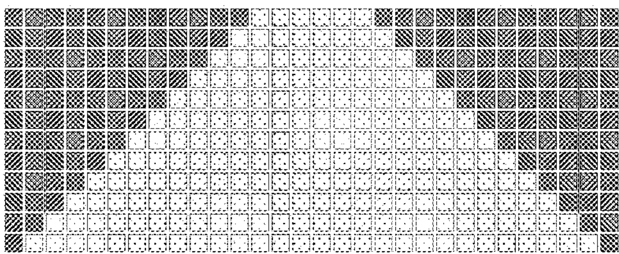
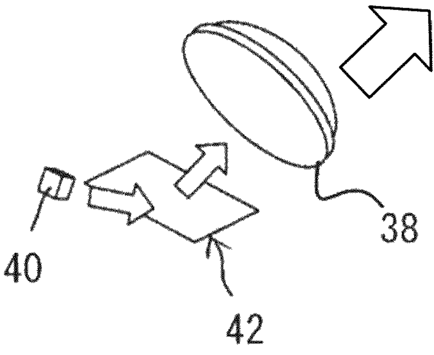
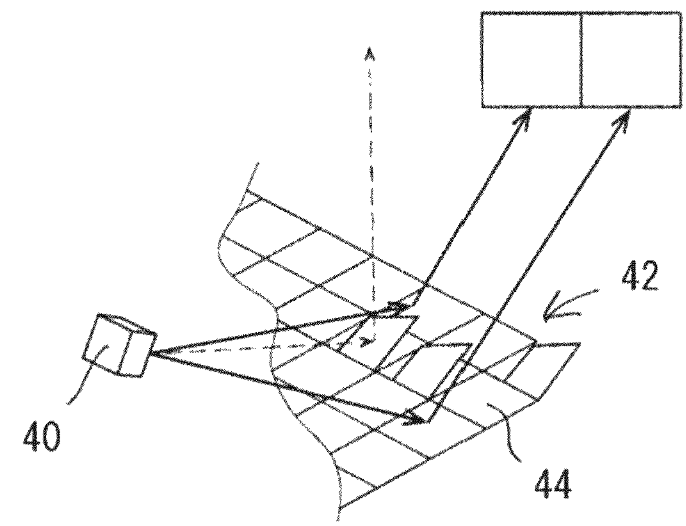

FIG.2C
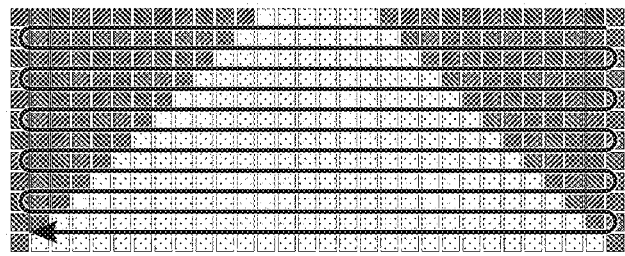
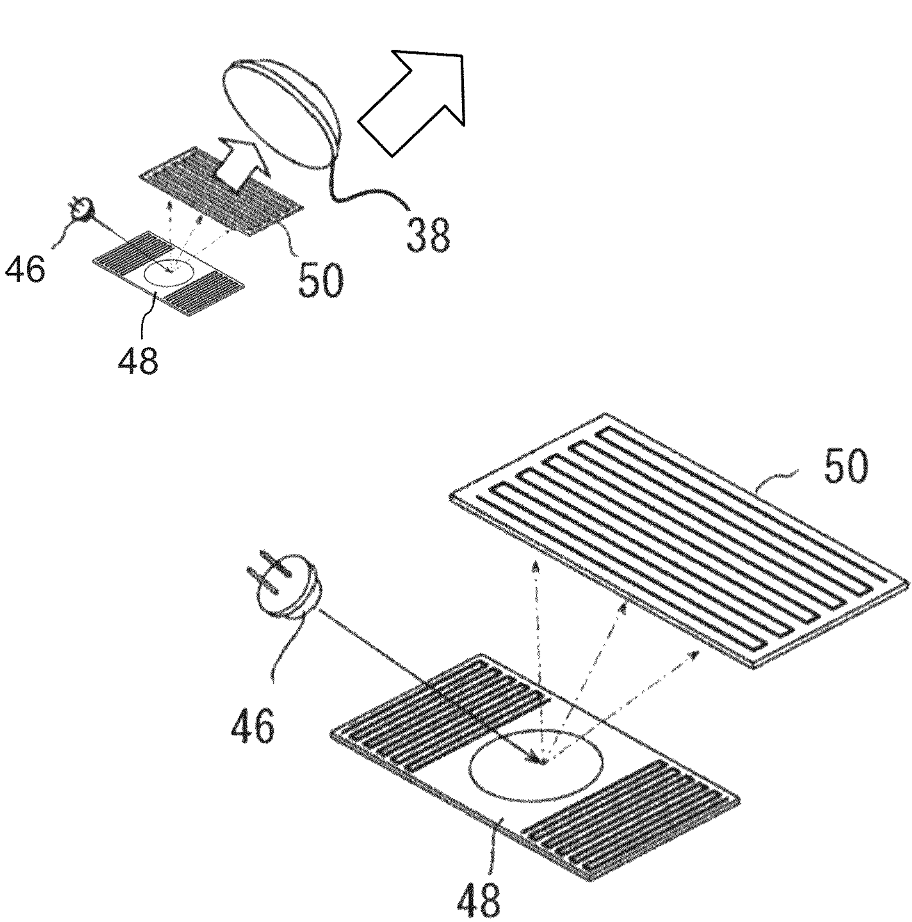

FIG.2D
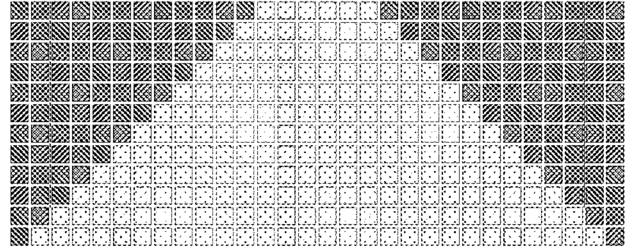
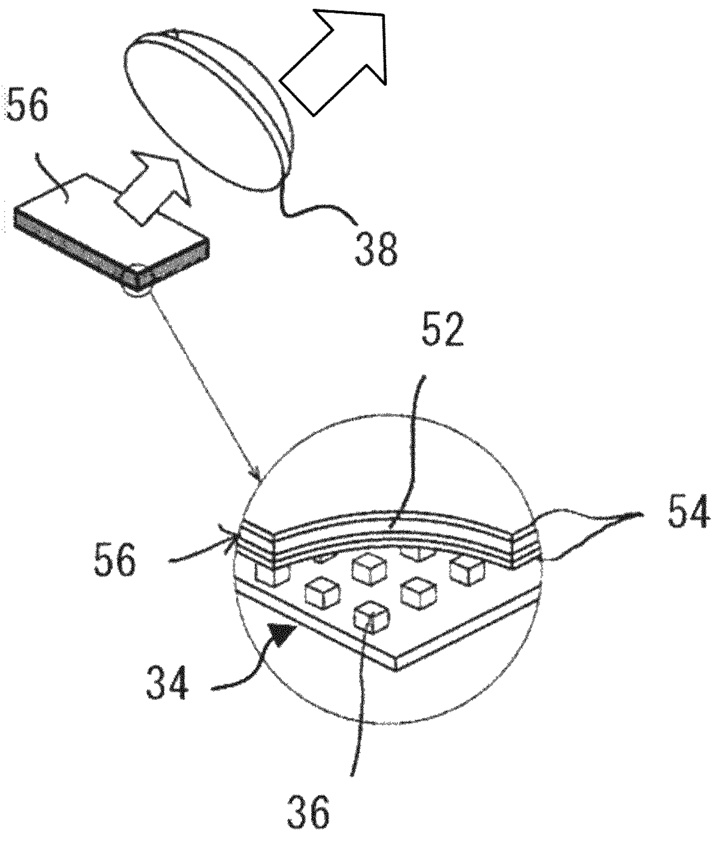

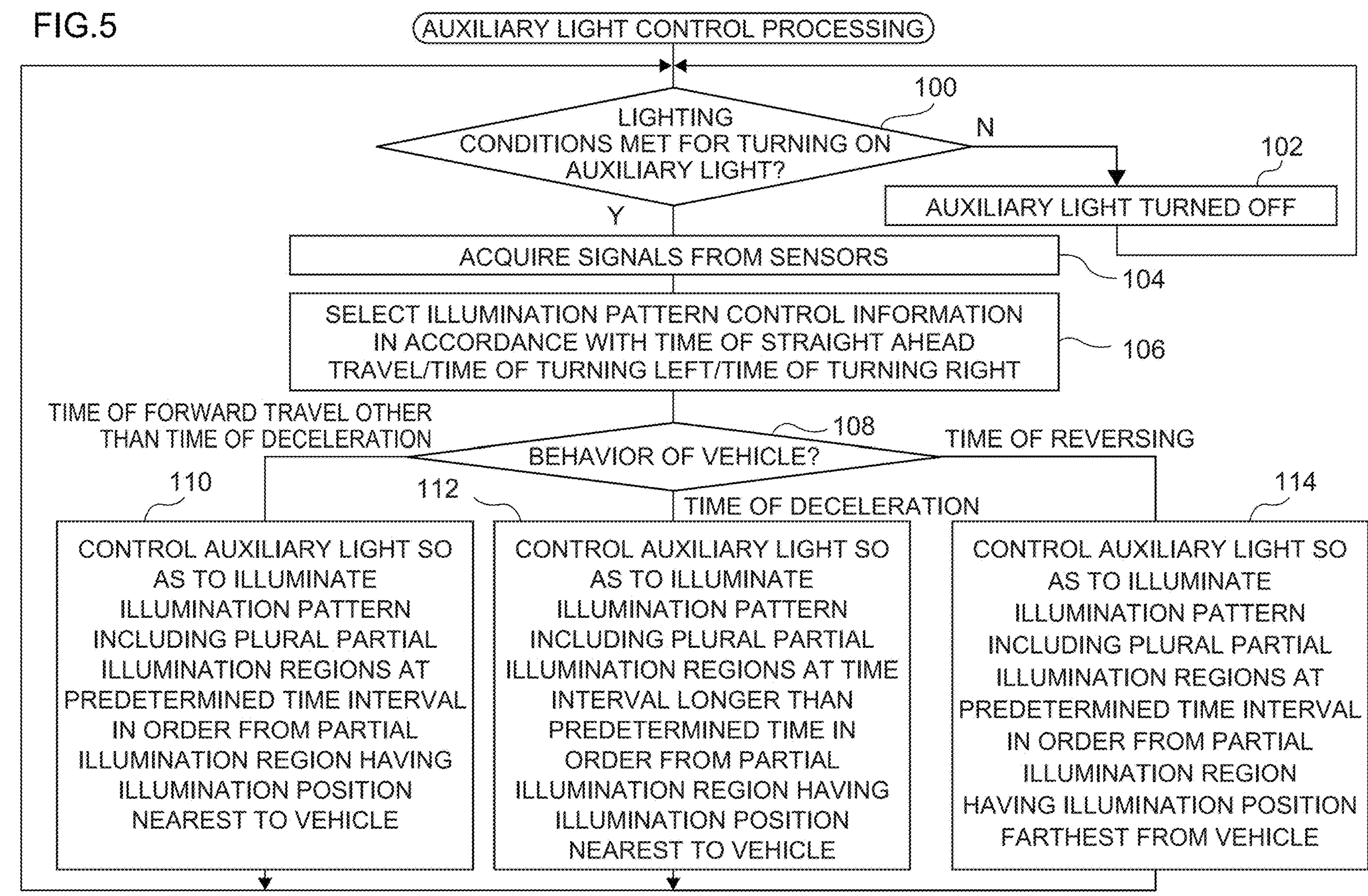
FIG.5
AUXILIARY LIGHT CONTROL PROCESSING
100
LIGHTING CONDITIONS MET FOR TURNING ON AUXILIARY LIGHT?
N
102
AUXILIARY LIGHT TURNED OFF
Y
ACQUIRE SIGNALS FROM SENSORS
104
SELECT ILLUMINATION PATTERN CONTROL INFORMATION IN ACCORDANCE WITH TIME OF STRAIGHT AHEAD TRAVEL/TIME OF TURNING LEFT/TIME OF TURNING RIGHT
106
TIME OF FORWARD TRAVEL OTHER THAN TIME OF DECELERATION
108
BEHAVIOR OF VEHICLE?
TIME OF REVERSING
TIME OF DECELERATION
110
CONTROL AUXILIARY LIGHT SO AS TO ILLUMINATE ILLUMINATION PATTERN INCLUDING PLURAL PARTIAL ILLUMINATION REGIONS AT PREDETERMINED TIME INTERVAL IN ORDER FROM PARTIAL ILLUMINATION REGION HAVING ILLUMINATION POSITION NEAREST TO VEHICLE
112
CONTROL AUXILIARY LIGHT SO AS TO ILLUMINATE ILLUMINATION PATTERN INCLUDING PLURAL PARTIAL ILLUMINATION REGIONS AT TIME INTERVAL LONGER THAN PREDETERMINED TIME IN ORDER FROM PARTIAL ILLUMINATION REGION HAVING ILLUMINATION POSITION NEAREST TO VEHICLE
114
CONTROL AUXILIARY LIGHT SO AS TO ILLUMINATE ILLUMINATION PATTERN INCLUDING PLURAL PARTIAL ILLUMINATION REGIONS AT PREDETERMINED TIME INTERVAL IN ORDER FROM PARTIAL ILLUMINATION REGION HAVING ILLUMINATION POSITION FARTHEST FROM VEHICLE

VEHICLE LIGHTING FIXTURE DEVICE

CROSS-REFERENCE TO RELATED APPLICATION

This application is based on and claims priority under 35 USC 119 from Japanese Patent Application No. 2023-206217, filed on Dec. 6, 2023, the entire disclosure of which is incorporated by reference herein.

BACKGROUND

Technical Field

The present disclosure relates to a vehicle lighting fixture device.

Related Art

A technique is described in Japanese Patent Application Laid-open (JP-A) No. 2021-127071 of controlling a road surface drawing lamp that illuminates a road surface with a beam, rendering a first pattern of a pattern having regularity ahead of the vehicle, and rendering a second pattern that is different from the first pattern when a predetermined event, such as proximity to a pedestrian, begins.

In the technique described in JP-A No. 2021-127071, there is no mention of switching the pattern of light illuminating the road surface when the behavior of the vehicle changes, such as during deceleration of the vehicle or when the vehicle reverses. Thus, in the technique described in JP-A No. 2021-127071, it is difficult for a traffic participant present in the vicinity of a vehicle to become aware of (a change in) the behavior of the vehicle.

SUMMARY

The present disclosure relates to a vehicle lighting fixture device that enables a traffic participant present in the vicinity of a vehicle to recognize the behavior of the vehicle.

A vehicle lighting fixture device according to a first aspect includes a control unit that, at a time of forward travel of a vehicle, other than at a time of deceleration of the vehicle, controls a lighting fixture of the vehicle so as to change, at a predetermined speed in a direction of travel of the vehicle, an illumination range or an illumination position on a road surface of light emitted from the lighting fixture, at a time of deceleration of the vehicle, controls the lighting fixture so as to change, at a lower speed than the predetermined speed in the direction of travel of the vehicle, the illumination range or the illumination position on a road surface of the light emitted from the lighting fixture, and at a time of reversing of the vehicle, controls the lighting fixture so as to change, in a direction of reversing of the vehicle, the illumination range or the illumination position on a road surface of the light emitted from the lighting fixture.

In the first aspect, the lighting fixture is controlled such that, during deceleration of the vehicle, the illumination range or the illumination position on the road surface of light emitted from the lighting fixture changes at a lower speed than a predetermined speed (the speed during forward travel of the vehicle other than during deceleration of the vehicle) in the vehicle travel direction. This enables a traffic participant present in the vicinity of the vehicle to recognize that the vehicle is decelerating from the speed of change of the illumination range or the illumination position of light on the road surface in the travel direction of the vehicle when the vehicle decelerates. Further, in the first aspect, the lighting fixture of the vehicle is controlled such that during reversing by the vehicle, the illumination range or the illumination position of light emitted from the lighting fixture of the vehicle on the road surface changes in the vehicle reversing direction. This enables a traffic participant in the vicinity of the vehicle to recognize that the vehicle is reversing from the direction of change of the illumination range or the illumination position of light on the road surface when the vehicle is reversing. Thus, the first aspect enables a traffic participant present in the vicinity of the vehicle to recognize the behavior of the vehicle.

A second aspect is the first aspect, in which the control unit changes the illumination range on the road surface in the direction of travel of the vehicle, by illuminating an illumination pattern, including plural partial illumination regions arrayed ahead of the vehicle, in order from a partial illumination region having an illumination position nearest to the vehicle, and changes the illumination range on the road surface in the direction of reversing of the vehicle, by illuminating the illumination pattern in order from a partial illumination region having an illumination position farthest from the vehicle.

In the second aspect, by illuminating an illumination pattern in which plural partial illumination regions are arrayed ahead of the vehicle, in order from the partial illumination region having the illumination position nearest to the vehicle or farthest from the vehicle, the illumination range of light on the road surface is changed in the travel direction or the reversing direction of the vehicle. This enables a traffic participant present in the vicinity of the vehicle to intuitively recognize the direction of change of the illumination range of light on the road surface. Further, the effecting of a change in the illumination range of light on the road surface in the travel direction or the reversing direction of the vehicle can be realized by simple processing.

A third aspect is the first aspect, in which the control unit changes the illumination position on the road surface in the direction of travel of the vehicle, by switching a partial illumination region to be illuminated in order from a partial illumination region having an illumination position nearest to the vehicle in an illumination pattern including plural partial illumination regions arrayed ahead of the vehicle, and changes the illumination position on the road surface in the direction of reversing of the vehicle, by switching a partial illumination region to be illuminated in order from a partial illumination region having an illumination position farthest from the vehicle in the illumination pattern.

In the third aspect, by switching the partial illumination region to be illuminated in order from the partial illumination region having the illumination position nearest to the vehicle or farthest from the vehicle in an illumination pattern including plural partial illumination regions arrayed ahead of the vehicle, the illumination position on the road surface is changed in the travel direction or the reversing direction of the vehicle. This enables a traffic participant present in the vicinity of the vehicle to intuitively recognize the direction of change of an illumination position of light on a road surface. Further, the effecting of a change in the illumination position of light on the road surface in the travel direction or the reversing direction of the vehicle can be realized by simple processing.

A fourth aspect is the first aspect, in which the control unit, at a time of forward travel of the vehicle, including a time of deceleration of the vehicle, controls an illumination region on the road surface of light emitted from the lighting fixture in a shape that is convex toward the direction of travel of the vehicle, and at a time of reversing of the vehicle, controls an illumination region on the road surface of light emitted from the lighting fixture in a shape that is convex toward the direction of reversing of the vehicle.

In the fourth aspect, the illumination area on the road surface of the light emitted from the lamp is controlled in a shape that is convex toward the vehicle travel direction when the vehicle moves forward, including during deceleration of the vehicle, and is controlled in a shape that is convex toward the vehicle reversing direction when the vehicle reverses. This enables a traffic participant present in the vicinity of the vehicle to intuitively recognize the travel direction of the vehicle.

The present disclosure enables a traffic participant present in the vicinity of a vehicle to recognize the behavior of the vehicle.

BRIEF DESCRIPTION OF THE DRAWINGS

Exemplary embodiments of the present disclosure will be described in detail based on the following figures, wherein:

FIG. 1 is a block diagram illustrating a schematic configuration of a vehicle lighting fixture device according to an exemplary embodiment;

FIGS. 2A to 2D are schematic diagrams illustrating exemplary configurations of auxiliary lights;

FIG. 5 is a flow chart illustrating details of auxiliary light control processing.

DETAILED DESCRIPTION

Figure 2A:
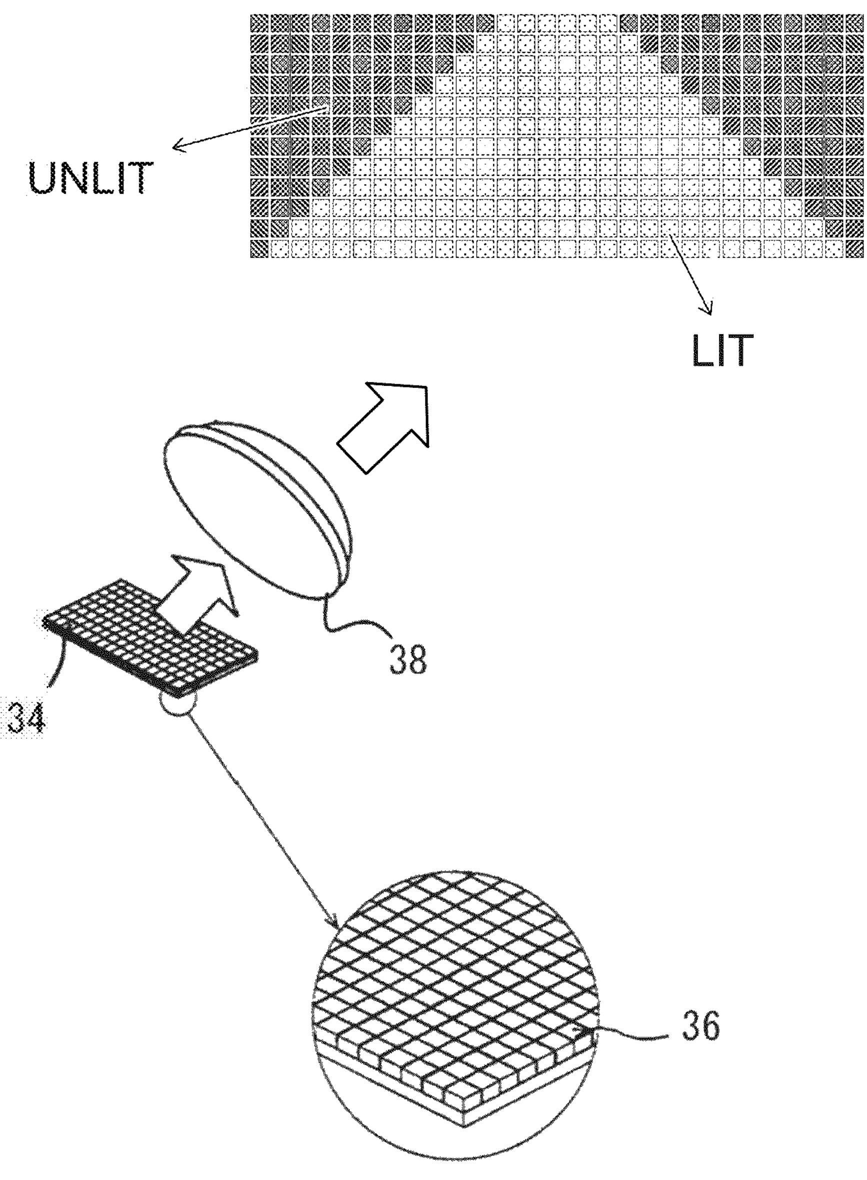

Detailed explanation follows regarding exemplary embodiments of the present disclosure, with reference to the drawings. The vehicle lighting fixture device 10 illustrated in FIG. 1 is installed in a vehicle (host vehicle), and includes a lighting fixture control ECU 22, a left and right pair of headlights 30L, 30R, and a left and right pair of auxiliary lights 32L, 32R. Further, the lighting fixture control ECU 22 is connected to a light switch 12, a turn signal switch 14, a steering angle sensor 16, a brake switch 18, a shift position sensor 20, and a vehicle speed sensor 21, respectively, through a communication line such as a CAN (Controller Area Network) bus.

The light switch 12 is provided with plural contact points including a first contact point for instructing lighting of the headlights 30L, 30R of the host vehicle, and a second contact point for instructing turning off of the headlights 30L, 30R of the host vehicle. When the light switch 12 is operated by an occupant of the host vehicle, a signal indicating which of the plural contact points is to be turned on and which of the contact points is to be turned off is output to the lighting fixture control ECU 22.

The turn signal switch 14 is provided with a first contact point for instructing blinking of a left turn signal lamp, a second contact point for instructing blinking of a right turn signal lamp, and a third contact point for instructing turning off of the turn signal lamps. When operated by an occupant of the host vehicle, the turn signal switch 14 outputs a signal to the lighting fixture control ECU 22 indicating which contact point is to be turned on and which contact point is to be turned off.

The steering angle sensor 16 detects a steering angle of the host vehicle, and outputs a signal indicating the detected steering angle of the host vehicle to the lighting fixture control ECU 22. The brake switch 18 is turned on when a brake pedal of the host vehicle is depressed by an occupant of the host vehicle, and outputs a signal indicating the on-off state of the switch to the lighting fixture control ECU 22. The shift position sensor 20 detects a shift position of the transmission of the host vehicle, and outputs a signal indicating the detected shift position to the lighting fixture control ECU 22. The vehicle speed sensor 21 detects the vehicle speed of the host vehicle, and outputs a signal indicating the detected vehicle speed to the lighting fixture control ECU 22.

The headlights 30L, 30R are headlights that have a constant light distribution pattern and illuminate a fixed range ahead of the vehicle. The headlights 30L, 30R may have any of LEDs (Light Emitting Diodes), HID (High Intensity Discharge), or halogen bulbs as a light source.

The auxiliary lights 32L, 32R are auxiliary lights that emit light toward a road surface ahead of the vehicle, and that are capable of changing a light illumination pattern on the road surface. As illustrated in FIG. 2A, for example, by expressing the auxiliary lights 32L, 32R in micro LED format, a configuration including an LED array 34 in which plural LED chips 36 are disposed in a matrix shape, and a lens 38 disposed at a light emitting side of the LED array 34, can be employed. In this configuration (micro LED format), the light emitted from each LED chip 36 is aligned in a matrix on the road surface, and by controlling the on and off state of each LED chip 36, the illumination pattern on the road surface can be changed to a given pattern.

The lighting fixture control ECU 22 includes a CPU (Central Processing Unit: Processor), a memory such as a ROM (Read Only Memory) or a RAM (Random Access Memory), a nonvolatile storage unit 26 such as a HDD (Hard Disk Drive) or an SSD (Solid State Drive), and a communication I/F (interface). A program (not illustrated in the drawings) for causing the CPU of the lighting fixture control ECU 22 to function as a control unit 24, and illumination pattern control information 28S, 28L, 28R, are stored in the storage unit 26.

Figure 3:
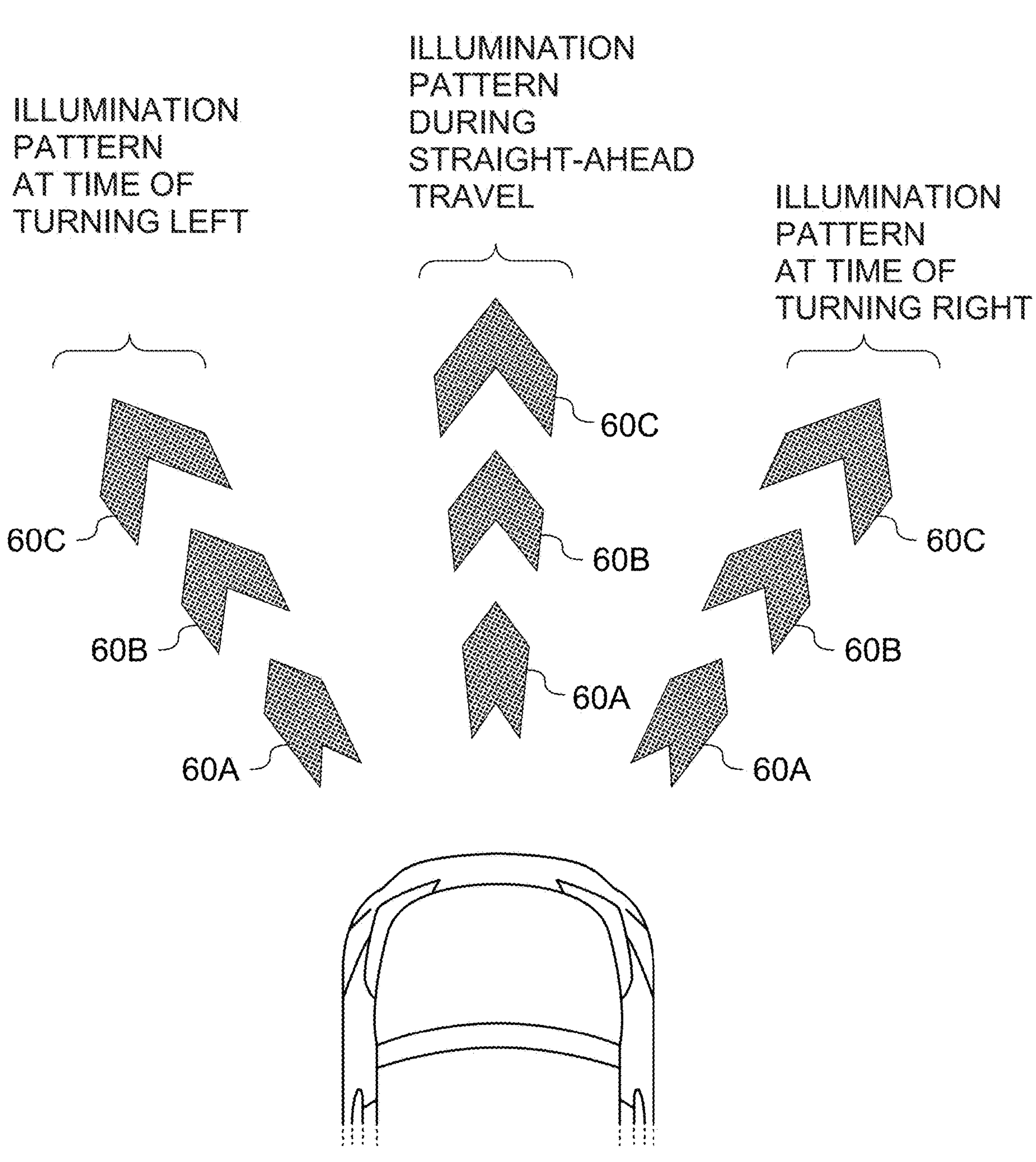
FIG. 3 is a schematic diagram illustrating exemplary illumination patterns at a time of straight ahead movement, a time of turning left, and a time of turning right.

In the present exemplary embodiment, three types of light illumination patterns on the road surface by the auxiliary lights 32L, 32R are prescribed, as illustrated in FIG. 3. The first illumination pattern corresponds to a state in which the host vehicle is traveling straight ahead, and three partial illumination regions 60A, 60B, 60C are patterns (see "illumination pattern during straight-ahead travel" in FIG. 3) arrayed along a direction toward the area ahead of the vehicle. The second illumination pattern corresponds to a state in which the host vehicle is turning left, and three partial illumination regions 60A, 60B, 60C are patterns (see "illumination pattern at time of turning left" in FIG. 3) arrayed along a direction toward the left and ahead of the vehicle. Note that when turning to the left as referred to herein, turning to the left at an intersection, changing lane to a left lane adjacent to the left of a travel lane, and the like, are included. The third illumination pattern corresponds to a state in which the host vehicle is turning right, and three partial illumination regions 60A, 60B, 60C are patterns (see "illumination pattern at time of turning right" in FIG. 3) arrayed along a direction toward the right and ahead of the vehicle. Note that when turning to the right as referred to herein, turning to the right at an intersection, changing lane to a right lane adjacent to the right of a travel lane, and the like, are included.

Each of the partial illumination regions 60A, 60B, 60C included in each of the above patterns has a shape that is convex toward the vehicle travel direction. The partial illumination region 60A, the partial illumination region 60B, and the partial illumination region 60C are arrayed in this order from the side closer to the vehicle. Note that the number of partial illumination regions configuring the illumination pattern may be other than three.

The illumination pattern control information 28S is information that controls the auxiliary lights 32L, 32R such that the light illumination pattern on the road surface by the auxiliary lights 32L, 32R is the illumination pattern during straight-ahead travel illustrated in FIG. 3. The illumination pattern control information 28L is information that controls the auxiliary lights 32L, 32R such that the light illumination pattern on the road surface by the auxiliary lights 32L, 32R is the illumination pattern at time of turning left illustrated in FIG. 3. The illumination pattern control information 28R is information that controls the auxiliary lights 32L, 32R such that the light illumination pattern on the road surface by the auxiliary lights 32L, 32R is the illumination pattern at a time of turning right illustrated in FIG. 3.

Further, in the present exemplary embodiment, the control unit 24 controls the turning on and off of each LED chip 36 in time series such that the light illumination pattern on the road surface by the auxiliary lights 32L, 32R changes in time series in the manner of an animation (the partial illumination region to be lit is switched in time series) in accordance with the behavior of the host vehicle. In addition, the illumination pattern control information 28S, 28L, 28R includes information (in the present exemplary embodiment, moving image data) that controls the turning on and off of individual LED chips 36 in time series, corresponding to each behavior of the vehicle; namely, when the vehicle moves forward other than during deceleration, when the vehicle decelerates, and when the vehicle reverses.

Figure 4A:
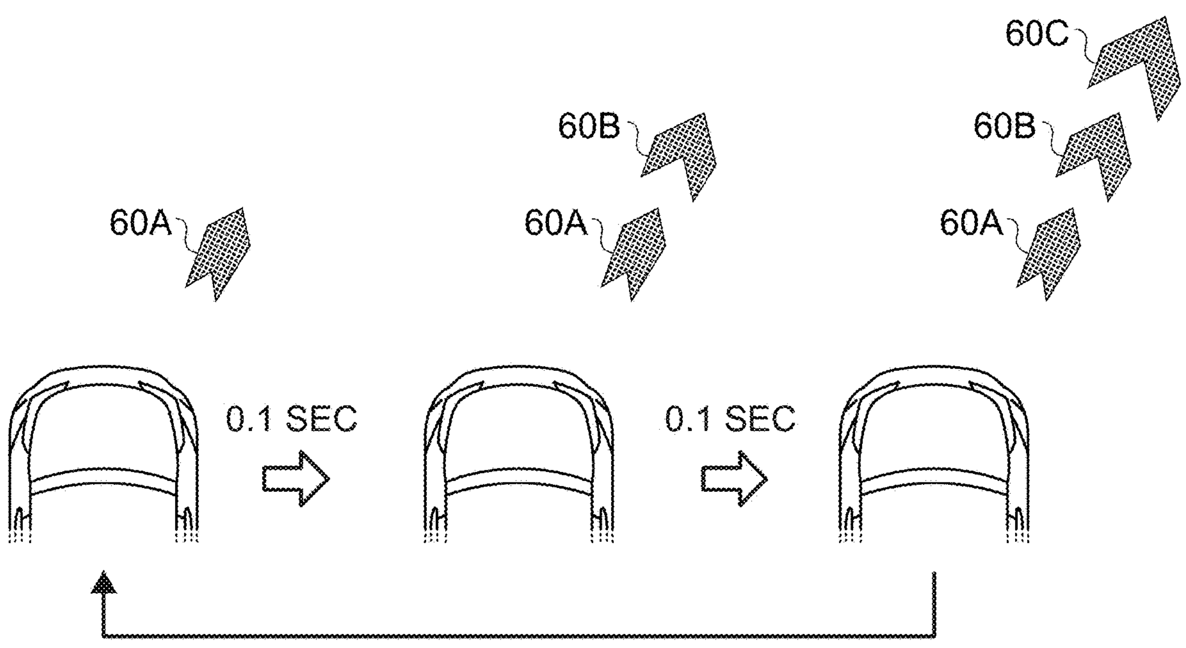
FIGS. 4A to 4C are schematic diagrams illustrating examples of time-series changes in illumination patterns.
Figure 4B:
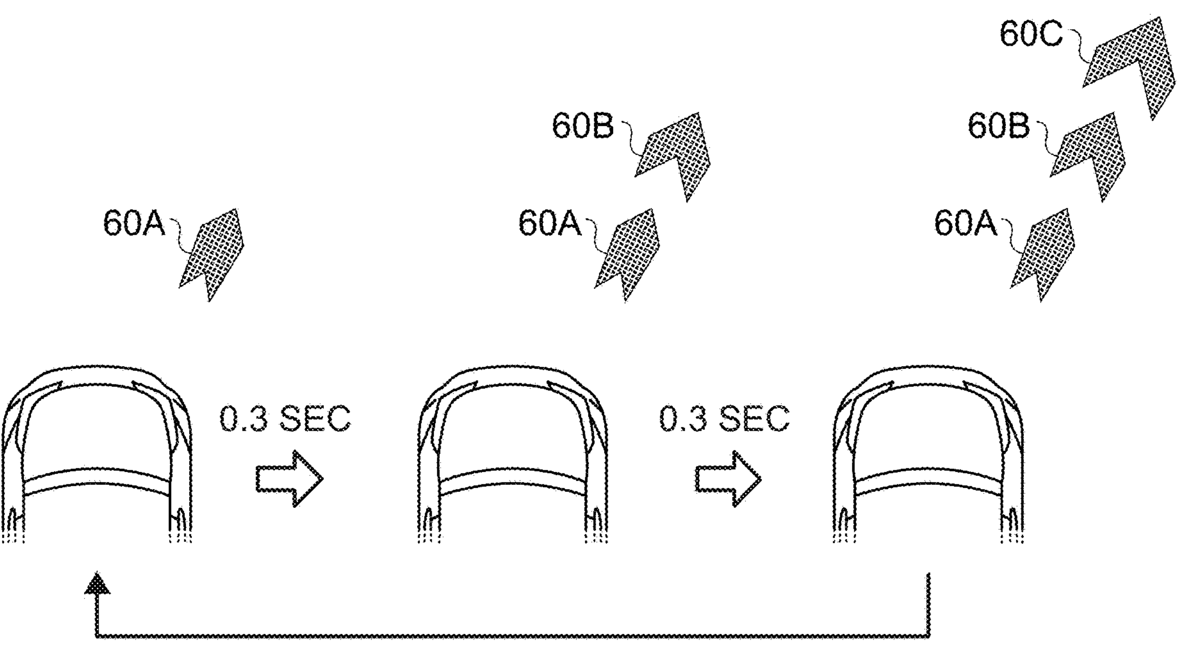

More specifically, when the vehicle travels forward, excluding when the vehicle is decelerating, switching is performed every first predetermined time t1 in the order illustrated in FIG. 4A from a first state in which only the partial illumination region 60A is illuminated→a second state in which the partial illumination regions 60A, 60B are illuminated→a third state in which all the partial illumination regions 60A, 60B, 60C are illuminated. This is hereafter referred to as the "changing pattern during forward travel". Further, when the vehicle decelerates, as illustrated in FIG. 4B, switching is performed every second predetermined time t2 in the order of the first state→the second state→the third state. This is hereafter referred to as the "changing pattern during deceleration". In the changing pattern during forward travel and the change pattern during deceleration, the illumination range of the light emitted from the auxiliary lights 32L, 32R on the road surface changes in the travel direction of the host vehicle. Note that first predetermined time t1 is less than the second predetermined time t2, an example of the first predetermined time t1 being 0.1 seconds, and an example of the second predetermined time t2 being 0.3 seconds.

When the vehicle reverses, switching is performed in the following order: a fourth state in which only the partial illumination region 60C is illuminated→a fifth state in which the partial illumination regions 60B, 60C are illuminated→a sixth state in which all the partial illumination regions 60A, 60B, 60C are illuminated. This is hereafter referred to as the "changing pattern during reversing". In the changing pattern during reversing, the illumination range of the light emitted from the auxiliary lights 32L, 32R on the road surface changes in the direction of reversing of the host vehicle. The illumination pattern control information 28R includes three types of moving image data corresponding to each of the changing pattern during forward travel, the changing pattern during deceleration, and the changing pattern during reversing described above.

Note that FIG. 4 shows the respective changing patterns during a right bend; however, three types of moving image data corresponding to each of the three types of changing patterns are also included in the illumination pattern control information 28S for straight-ahead travel and the illumination pattern control information 28L for turning left.

The control unit 24 turns on the headlights 30L, 30R when the first contact point of the light switch 12 is on based on switch contact information input from the light switch 12. When the second contact point of the light switch 12 is on, the control unit 24 turns off the headlights 30L, 30R. Note that the control unit 24 may turn on the headlights 30L, 30R when the illumination in the vicinity of the host vehicle is lower than a threshold value.

Further, the control unit 24 turns on the auxiliary lights 32L, 32R while the lighting conditions (detailed described below) for the auxiliary lights 32L, 32R are satisfied. More specifically, based on the corresponding moving image data, when the host vehicle moves forward, except during deceleration of the host vehicle, the control unit 24 controls the auxiliary lights 32L, 32R such that the illumination range of the light emitted from the auxiliary lights 32L, 32R on the road surface changes at a predetermined speed (a time interval of a first predetermined time t1) in the travel direction of the host vehicle. Further, when the host vehicle is decelerating, the control unit 24, based on the corresponding moving image data, controls the auxiliary lights 32L, 32R such that the illumination range of the light emitted from the auxiliary lights 32L, 32R on the road surface changes at a speed lower than the predetermined speed (a time interval of a second predetermined time t2) in the travel direction of the host vehicle. Further, when the host vehicle reverses, the control unit 24, based on the corresponding moving image data, controls the auxiliary lights 32L, 32R such that the illumination range of the light emitted from the auxiliary lights 32L, 32R on the road surface changes toward the reversing direction of the host vehicle.

Explanation follows regarding auxiliary light control processing that is executed by the control unit 24 (the CPU of the lighting fixture control ECU 22) while the ignition switch of the host vehicle is on, as an operation of the present exemplary embodiment, with reference to FIG. 5.

In step 100 of the auxiliary light control processing, the control unit 24 determines whether or not lighting conditions for the auxiliary lights 32L, 32R are satisfied. The determination can be made in step 100 that the lighting conditions for the auxiliary lights 32L, 32R are satisfied, for example, in cases in which the headlights 30L, 30R are on. Alternatively, for example, when the degree of illumination in the vicinity of the host vehicle is less than a threshold value, it may be determined that the lighting conditions for the auxiliary lights 32L, 32R are satisfied. Further, for example, in cases in which a switch for instructing turning on and off of the auxiliary light 32 is provided, and a predetermined contact point that instructs turning on of the auxiliary lamp 32 is turned on at the switch, it may be determined that the lighting conditions for the auxiliary lights 32L, 32R are satisfied. Alternatively, for example, it may be determined that the lighting conditions of the auxiliary lights 32L, 32R are satisfied while the ignition switch of the host vehicle is on.

When the determination in step 100 is negative, the processing proceeds to step 102. In step 102, the control unit 24 turns off the auxiliary lights 32L, 32R. When the processing of step 102 has been performed, the processing returns to step 100, and steps 100 and 102 are repeated until the determination in step 100 is affirmative. When the lighting conditions for the auxiliary lights 32L, 32R are satisfied, the determination in step 100 is affirmative, and the processing proceeds to step 104.

In step 104, the control unit 24 acquires respective signals from sensors such as the turn signal switch 14, the steering angle sensor 16, the brake switch 18, the shift position sensor 20, and the vehicle speed sensor 21. In step 106, the control unit 24 determines whether the host vehicle is traveling straight ahead, turning left, or turning right, based on the signal acquired in step 104. The corresponding illumination pattern control information 28S, illumination pattern control information 28L, or illumination pattern control information 28R is selected in accordance with the determination result.

Note that as an example of determination as to whether the host vehicle is traveling straight ahead, turning left, or turning right, it is possible to determine straight-ahead travel when the host vehicle's turn signal lamp is off, turning left when the left turn signal lamp of the host vehicle is blinking, and turning right when the right turn signal lamp of the host vehicle is flashing. Further, straight-ahead travel may be determined when the steering angle of the host vehicle is 0, turning left may be determined when the steering angle of the host vehicle is not 0 and the direction of the steering angle is the left direction, and turning right may be determined when the steering angle of the host vehicle is not 0 and the direction of the steering angle is the right direction.

In step 108, based on the signal acquired in step 104, the control unit 24 determines whether the behavior of the vehicle is "a time of forward movement other than a time of deceleration", "a time of deceleration", or "a time of reversing", and branches the processing in accordance with the determination result. For example, in cases in which the vehicle speed is greater than 0, the brake switch 18 is off, and the shift position of the transmission of the host vehicle is in the D range, the behavior of the vehicle is determined to be "a time of forward movement other than a time of deceleration". Further, when, for example, the vehicle speed is greater than 0, the brake switch 18 is on, and the shift position of the transmission of the host vehicle is in the D range, the behavior of the vehicle is determined to be "a time of deceleration". Further, when, for example, the vehicle speed is greater than 0, the brake switch 18 is off, and the shift position of the transmission of the host vehicle is in the R range, the behavior of the vehicle is determined to be "a time of reversing".

When it is determined that the behavior of the vehicle is "a time of forward movement other than a time of deceleration", the processing proceeds from step 108 to step 110. In step 110, the control unit 24 extracts moving image data corresponding to the "changing pattern during forward travel" from the illumination pattern control information 28 selected in step 106, and controls turning on and off of each LED chip 36 of the auxiliary lights 32L, 32R in time series based on the extracted moving image data. Thus, as also illustrated in FIG. 4A, as an example, the auxiliary lights 32L, 32R are controlled such that the illumination pattern including the plural partial illumination regions 60A, 60B, 60C is illuminated at time intervals of a first predetermined time t1 in order from the partial illumination region 60A at the side having the nearest illumination position to the host vehicle.

When it is determined that the behavior of the vehicle is "a time of deceleration", the processing proceeds from step 108 to step 112. In step 112, the control unit 24 extracts moving image data corresponding to the "changing pattern during deceleration" from the illumination pattern control information 28 selected in step 106, and controls turning on and off of each LED chip 36 of the auxiliary lights 32L, 32R in time series based on the extracted moving image data. Thus, as also illustrated in FIG. 4B, as an example, the auxiliary lights 32L, 32R are controlled such that the illumination pattern including the plural partial illumination regions 60A, 60B, 60C is illuminated at time intervals of a first predetermined time t2 that is longer than the first predetermined time t1 in order from the partial illumination region 60A at the side having the nearest illumination position to the host vehicle.

Figure 4C:
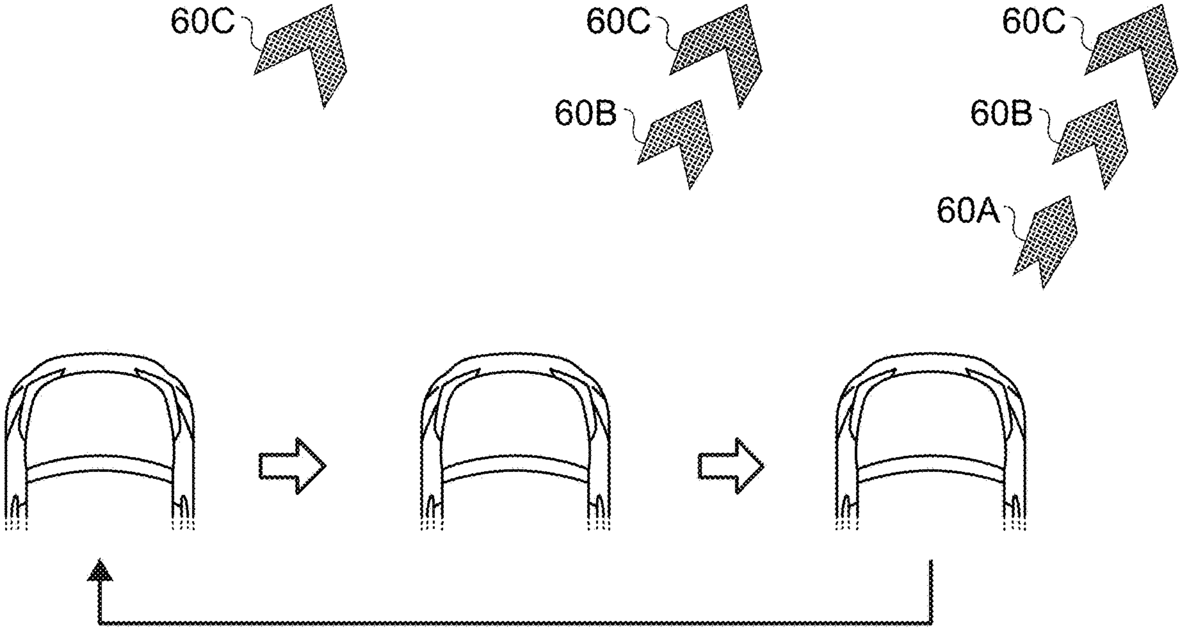

Further, when it is determined that the behavior of the vehicle is "a time of reversing", the processing proceeds from step 108 to step 114. In step 114, the control unit 24 extracts moving image data corresponding to the "changing pattern during reversing", from the illumination pattern control information 28 selected in step 106, and controls turning on and off of each LED chip 36 of the auxiliary lights 32L, 32R in time series based on the extracted moving image data. Thus, as illustrated in FIG. 4C, as an example, the auxiliary lights 32L, 32R are controlled such that the illumination pattern including the plural partial illumination regions 60A, 60B, 60C is illuminated in order from the partial illumination region 60C at the side having the farthest illumination position from the host vehicle. Note that in cases in which the behavior of the vehicle is "a time of reversing", the time interval at which the partial illumination region is lit may be the first predetermined time t1 or the second predetermined time t2, or may be another time.

As explained above, in the present exemplary embodiment, the control unit 24 controls the auxiliary lights 32L, 32R such that when the vehicle moves forward, except during deceleration of the vehicle, the illumination range of the light emitted from the auxiliary lights 32L, 32R on the road surface changes at a predetermined speed toward the vehicle travel direction, controls the auxiliary lights 32L, 32R such that when the vehicle decelerates, the illumination range on the road surface of the light emitted from the auxiliary lights 32L, 32R changes at a speed lower than the predetermined speed in the vehicle travel direction, and when the vehicle reverses, controls the auxiliary lights 32L, 32R such that the illumination range of the light emitted from the auxiliary lights 32L, 32R on the road surface changes toward the vehicle reversing direction. This enables a traffic participant present in the vicinity of the vehicle to be made aware of the behavior of the vehicle.

Further, in the present exemplary embodiment, the control unit 24 illuminates the illumination pattern in which the plural partial illumination regions 60A, 60B, 60C are arrayed ahead of the vehicle sequentially from the partial illumination region 60A at the side having the nearest illumination position to the vehicle, thereby changing the illumination range on the road surface toward the vehicle travel direction, and illuminates the illumination pattern sequentially from the partial illumination area 60C at the side having the farthest illumination position from the host vehicle, thereby changing the illumination range on the road surface toward the vehicle reversing direction. This enables a traffic participant present in the vicinity of the vehicle to intuitively recognize the changing direction of the illumination range of light on the road surface, and in addition, enables the changing of the illumination range of light on the road surface in the traveling direction or the reversing direction of the vehicle to be realized by simple processing.

Figure 6A:
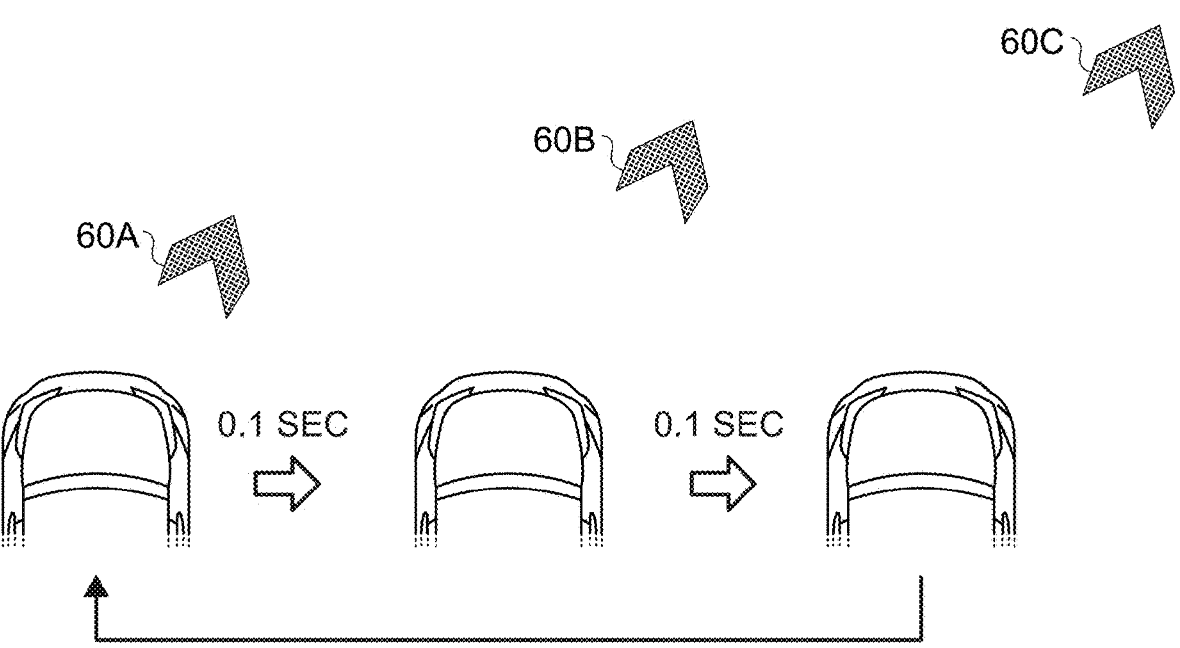
FIGS. 6A to 6C are schematic diagrams illustrating other examples of time-series changes in illumination patterns.

Note that in the above exemplary embodiment, explanation has been made regarding an aspect in which the illumination range of the illumination pattern on the road surface is changed toward the travel direction or the reversing direction of the vehicle (see FIGS. 4A to 4C); however, the present disclosure is not limited thereto. For example, the control unit 24 may control the auxiliary lights 32L, 32R such that the illumination position on the road surface of the light emitted from the auxiliary lights 32L, 32R changes at a predetermined speed toward the vehicle travel direction when the vehicle moves forward other than during deceleration of the vehicle (see FIG. 6A). This can be realized by switching the partial illumination region that is illuminated, from within the illumination pattern in which plural partial illumination regions 60A, 60B, 60C are arrayed ahead of the vehicle, at time intervals of a first predetermined time t1 in order from the partial illumination region 60A at the side having the nearest illumination position to the vehicle.

Figure 6B:
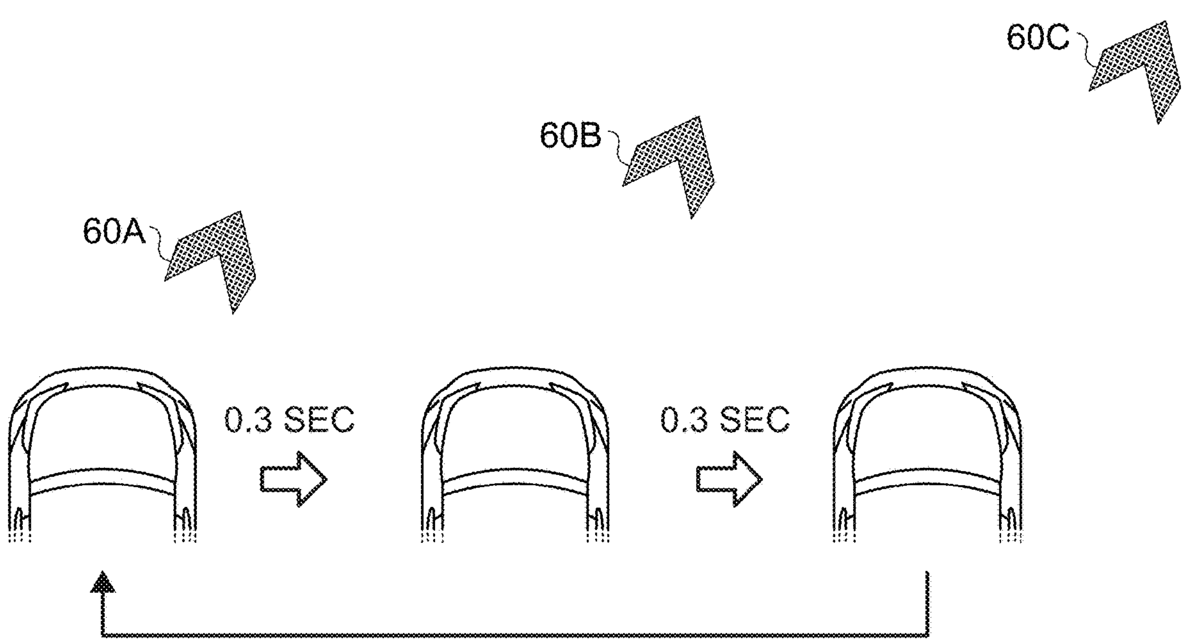

When the vehicle decelerates, the control unit 24 may control the auxiliary lights 32L, 32R such that the illumination position on the road surface of the light emitted from the auxiliary lights 32L, 32R changes in the vehicle travel direction at a speed lower than the predetermined speed (see FIG. 6B). This can be realized by switching the partial illumination region that is illuminated, from within the illumination pattern in which plural partial illumination regions 60A, 60B, 60C are arrayed ahead of the vehicle, at time intervals of a second predetermined time t2 in order from the partial illumination region 60A at the side having the nearest illumination position to the vehicle.

Figure 6C:
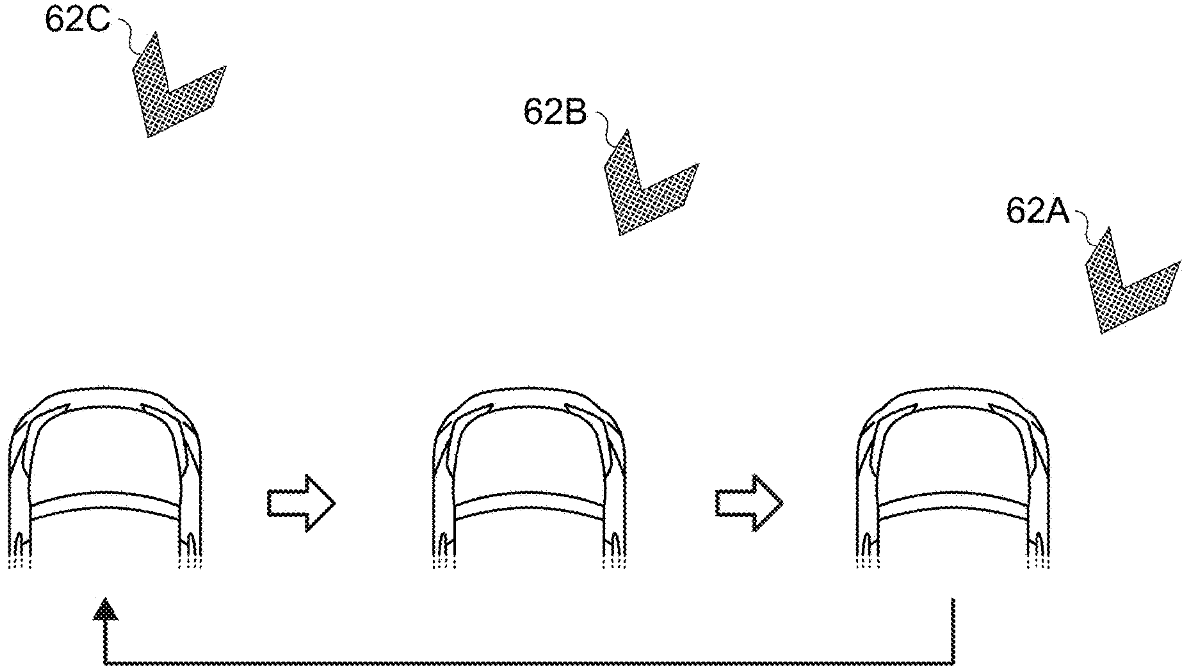

Further, the control unit 24 may control the auxiliary lights 32L, 32R such that when the vehicle reverses, the illumination position of the light emitted from the auxiliary lights 32L, 32R on the road surface changes toward the vehicle reversing direction (see FIG. 6C). This can be realized by switching the partial illumination region that is illuminated, from within the illumination pattern in which plural partial illumination regions 62A, 62B, 62C are arrayed ahead of the vehicle, in order from the partial illumination area 62C at the side having the farthest illumination position from the vehicle. As illustrated in FIG. 6C, the illumination pattern during vehicle reversing may be configured from partial illumination regions 62A, 62B, 62C that are convex in the vehicle reversing direction. This enables a traffic participant present in the vicinity of the vehicle to more intuitively recognize that the vehicle is reversing.

In the above-described exemplary embodiment, explanation has been made regarding an aspect in which different moving image data are provided at the time of vehicle forward travel other than at a time of vehicle deceleration, and at a time of vehicle deceleration; however, the present disclosure is not limited thereto. For example, together with sharing moving image data at a time of vehicle forward travel other than at a time of vehicle deceleration, and at a time of vehicle deceleration, by switching the frame rates (on and off control cycles) of the LED arrays 34 of the auxiliary lights 32L, 32R between when the vehicle is moving forward other than at a time of vehicle deceleration and when the vehicle is decelerating, the illumination range or the speed of change of the illumination position of light on the road surface may be switched.

In the above-described exemplary embodiment, explanation has been made regarding an aspect in which the illumination pattern control information is configured with moving image data; however, the present disclosure is not limited thereto. For example, control information that controls the illumination pattern of light on the road surface in the first state, the second state, and/or the third state illustrated in FIG. 4A may be retained in the form of two-dimensional image data, respectively. In such cases, the control of the illumination pattern of light on the road surface in the first state, the second state, or the third state in accordance with the respective control information is switched at time intervals of the first predetermined time t1 or the second predetermined time t2, whereby the illumination pattern can be changed in the same manner as in cases in which moving image data is used during vehicle forward travel including during vehicle deceleration. Alternatively, for example, control information that controls the illumination pattern of light on the road surface in the fourth state, the fifth state, or the sixth state illustrated in FIG. 4C may be retained in the form of two-dimensional image data, respectively. In such cases, by switching, at predetermined time intervals, the illumination pattern of light on the road surface to the fourth state, the fifth state, or the sixth state in accordance with the respective control information, the illumination pattern can be changed when the vehicle is reversing in the same manner as in cases in which moving image data is used.

In the above exemplary embodiment, the micro LED system illustrated in FIG. 2A has been described as a configuration of the auxiliary lights 32L, 32R that are capable of changing illumination patterns on a road surface; however, the present disclosure is not limited to micro LED systems.

In the DMD (Digital Mirror Device) system illustrated in FIG. 2B, for example, the DMD 42 and the lens 38 are disposed in order at the light emitting side of the LED light source 40. In the DMD 42, plural micro-mirrors 44 that are capable of changing angle are disposed in a matrix form, and the individual micro-mirrors 44 are controlled at a first angle that reflects incident light into the lens 38, or a second angle that reflects incident light out of the lens 38. When the DMD system is employed as the auxiliary lights 32L, 32R, in a state in which the individual micro-mirrors 44 of the DMD 42 are controlled at the first angle, the light reflected by the individual micro-mirrors 44 is aligned in a matrix on the road surface. Thus, by controlling the angle of each micro-mirror 44 to the first angle or the second angle, the illumination pattern on the road surface can be changed to a given pattern.

Further, in the laser scanning method illustrated in FIG. 2C, for example, a MEMS (Micro Electro Mechanical System) mirror 48, a phosphor 50, and a lens 38 are disposed in order at a light emitting side of a blue laser light source 46. The angle of the MEMS mirror 48 is controlled such that a laser beam incident on the mirror is scanned two-dimensionally. The phosphor 50 performs wavelength conversion of the incident scanning laser beam. In cases in which a laser scanning method is employed as the auxiliary lights 32L, 32R, the laser light reflected by the MEMS mirror 48 and passing through the phosphor 50 and the lens 38 in this order scans on the road surface in two dimensions. Thus, the illumination pattern on the road surface can be changed to a given pattern by controlling the turning on and off of the blue laser light source 46 at a timing at which the laser light scans each position on the road surface.

Further, in the liquid crystal system illustrated in FIG. 2D, for example, a liquid crystal panel 56 and a lens 38, each having a configuration in which front and rear surfaces of a liquid crystal layer 52 are sandwiched between a pair of polarizing plates 54, are disposed in order on a light emitting side of an LED array 34 in which plural LED chips 36 are disposed in a matrix shape. When a liquid crystal display system is employed as the auxiliary lights 32L, 32R, light transmitted through the individual liquid crystal cells of the liquid crystal panel 56 is aligned in a matrix on the road surface, and by controlling the light transmittance of each liquid crystal cell of the liquid crystal panel 56, the illumination pattern on the road surface can be changed to a given pattern.

What is claimed is:

1. A vehicle lighting fixture device, comprising:

a memory; and a processor coupled to the memory, the processor being configured to:

at a time of forward travel of a vehicle, other than at a time of deceleration of the vehicle, control a lighting fixture of the vehicle so as to change, at a predetermined speed in a direction of travel of the vehicle, an illumination range or an illumination position on a road surface of light emitted from the lighting fixture, at a time of deceleration of the vehicle, control the lighting fixture so as to change, at a lower speed than the predetermined speed in the direction of travel of the vehicle, the illumination range or the illumination position on a road surface of the light emitted from the lighting fixture, and at a time of reversing of the vehicle, control the lighting fixture so as to change, in a direction of reversing of the vehicle, the illumination range or the illumination position on a road surface of the light emitted from the lighting fixture.

2. The vehicle lighting fixture device of claim 1, wherein the processor is configured to:

change the illumination range on the road surface in the direction of travel of the vehicle, by illuminating an illumination pattern, comprising a plurality of partial illumination regions arrayed ahead of the vehicle, in order from a partial illumination region having an illumination position nearest to the vehicle, and change the illumination range on the road surface in the direction of reversing of the vehicle, by illuminating the illumination pattern in order from a partial illumination region having an illumination position farthest from the vehicle.

3. The vehicle lighting fixture device of claim 1, wherein the processor is configured to:

change the illumination position on the road surface in the direction of travel of the vehicle, by switching a partial illumination region to be illuminated in order from a partial illumination region having an illumination position nearest to the vehicle in an illumination pattern comprising a plurality of the partial illumination regions arrayed ahead of the vehicle, and change the illumination position on the road surface in the direction of reversing of the vehicle, by switching a partial illumination region to be illuminated in order from a partial illumination region having an illumination position farthest from the vehicle in the illumination pattern.

4. The vehicle lighting fixture device of claim 1, wherein the processor is configured to:

at a time of forward travel of the vehicle, including a time of deceleration of the vehicle, control an illumination region on the road surface of light emitted from the lighting fixture in a shape that is convex toward the direction of travel of the vehicle, and at a time of reversing of the vehicle, control an illumination region on the road surface of light emitted from the lighting fixture in a shape that is convex toward the direction of reversing of the vehicle.

* * * * *